Figure 1:
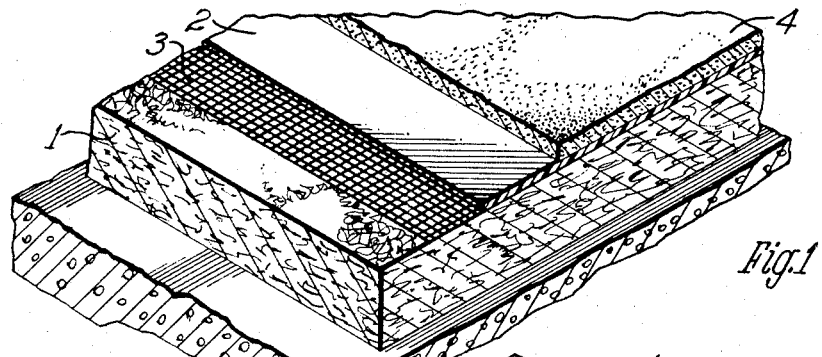

June 25, 1968  E. HORBACH  3,389,518

RESILIENT CELLULAR WALL COVERING AND APPLYING IT

Filed June 9, 1964

INVENTOR

Edwin Horbach

BY

Michael S. Striker

ATTORNEY

United States Patent Office 3,389,518
Patented June 25, 1968

3,389,518
RESILIENT CELLULAR WALL COVERING
AND APPLYING IT
Edwin Horbach, Bruhlbachweg 10,
Stuttgart-Rohr, Germany
Filed June 9, 1964, Ser. No. 373,678
4 Claims. (Cl. 52—309)

The present invention relates to a wall covering and the method for making the same and, more particularly, to a wall covering or composite building element which will be thermo-insulating and of low weight.

Porous materials such as foam concrete, foam glass, pressed fibers and the like have been used for building purposes, usually in the shape of plates. It is one of the important characteristics of such porous plates that they possess sound absorbing properties and are of low heat conductivity. Such plates thus possess insulating properties with respect to heat and sound. Furthermore, due to the relatively low weight of such porous plates, they can be easily and economically hauled from producer to distributor or to the place where the plates are to be used.

However, such conventional porous insulating plates and the like have certain disadvantages. First of all, the outer faces of such plates are porous, i.e. pores open into the outer face of the plates and moisture as well as dirt will be easily deposited on such porous surfaces, while moisture and dirt would not so easily attach itself to a smooth and continuous, i.e. non-porous surface. Particularly the entry of moisture into the pores of such plates will cause deterioration of the same, and their sensitivity to dirt will after a short time spoil the appearance of, for instance, an inner wall formed of such porous plates. Furthermore, porous plates cannot be assembled without joints between adjacent plates and these joints or seams between the adjacent plates of, for instance, a wall covering formed of such conventional porous plates usually have to be filled or covered. This will require additional work and material. It is also a disadvantage of conventional porous plates that they possess very little mechanical strength and coherence so that breakage or minor damage of the plates will easily take place during transportation of the same, as well as during forming of a wall or the like of such conventional porous plates. Particularly the edges and corners of such porous plates are easily damaged, and, furthermore, these plates have very low elasticity and flexibility.

The stiffness and brittleness of such porous plates is not remedied when at the outer face, for instance of a wall formed of such porous plates, a surface coating of lacquer, plaster, or the like is applied. The low mechanical resistance of the porous plates which carry such lacquer, plaster or the like layer will be conveyed to such coating since the plaster, lacquer, or the like layer, per se, is not a self-supporting structure.

It is quite obvious that the above discussed qualities of conventional porous plates will not only cause difficulties during mounting or assembling of the same, but also when, for whatever reason, the wall or the like formed of such plates has to be repaired or altered, and the costs of any such alteration are increased by the replacement costs of plates which are damaged during such work.

Furthermore, it is well known, that all building elements and walls or the like are subject to slight movements which are caused either by the nature of the material of the building element or the like, or by variations in the temperature or in the geological conditions of the location of the building or the like incorporating such wall or building elements. These, even though slight, movements lead to stresses and crack formation. In order to avoid crack formation, sometimes extension joints are required such as are well known in connection with concrete structures. The surface of a concrete structure frequently shows thin hair cracks which are formed, for instance, by quick cooling of the structure such as might occur due to a sudden shower on a hot summer day. Cracks on the outside of buildings do not only represent damage to the surface but they may also extend in a cross-sectional direction throughout the entire wall. Moisture will be attracted by such cracks and evaporation will be slowed down as compared with the evaporation of moisture located at the outer face of the wall. When the temperature then drops below the freezing point of water, the moisture located in such cracks will frequently cause splintering off of small parts of the outer region of the wall. Thus the useful life span of the wall is considerably reduced by such crack formation.

It is therefore an object of the present invention to provide a building element or wall covering which will not be subject to the above discussed disadvantages.

It is a further object of the present invention to provide a composite building element, particularly a wall covering, which will combine insulating properties with relatively light weight and high mechanical resistance, so that crack formation in the area of the outer face of such wall covering will be avoided.

It is yet another object of the present invention to provide a wall covering which will be adapted in its interior portion to take up or absorb any stresses or cracks which may form in the underlying wall structure so that, notwithstanding such cracks in the interior of the wall covering, the outer face of the wall covering will remain continuous and crack-free.

It is still another object of the present invention to provide a method for producing a wall covering having an outer face which will remain substantially crack-free, and which wall covering will be of relatively light weight, which method can be carried out in a simple and economical manner.

Other objects and advantages of the present invention will become apparent from a further reading of the description and the appended claims.

With the above and other objects in view, the present invention contemplates a wall covering, comprising, in combination, a resilient thermo-insulating cellular layer adapted to be adhered to a supporting wall member and to take up any cracks forming in the wall member; a continuous solid outer coating, and a continuous intermediate layer consisting essentially of a synthetic resin having a reinforcing fabric embedded therein interposed between and firmly adhering to the cellular layer and the continuous solid outer coating, whereby the continous outer coating will remain unaffected by any movement or cracks formed in the supporting wall member, due to the resilient absorption of such movement and the taking up of such cracks by said resilient cellular layer.

The present invention is also concerned with a method of producing a wall covering, roofing and the like, comprising the steps of adhering to a support adjacent to and contacting each other a plurality of resilient thermo-insulating cellular plates, forming on the free face of the plurality of resilient cellular plates a continuous intermediate layer adhering to the cellular resilient plates and consisting essentially of a synthetic resin having a reinforcing fabric embedded therein, and forming on the free outer face of the intermediate layer a continuous solid coating.

Figure 2:
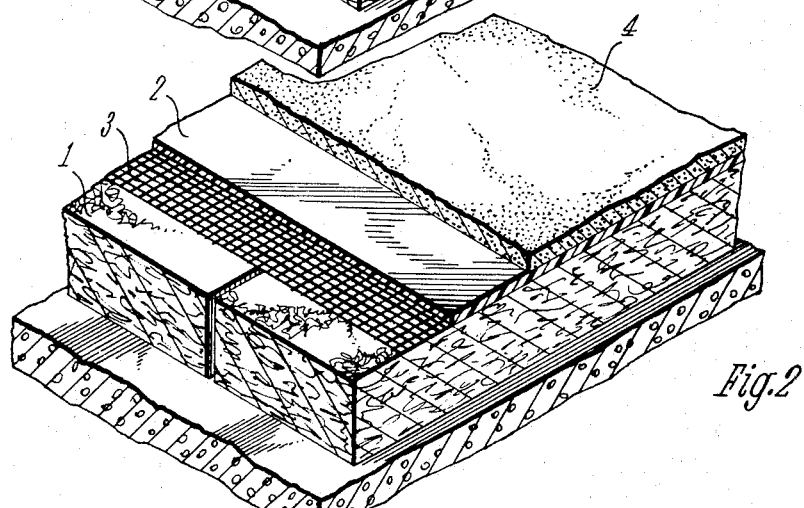
Figure 3:
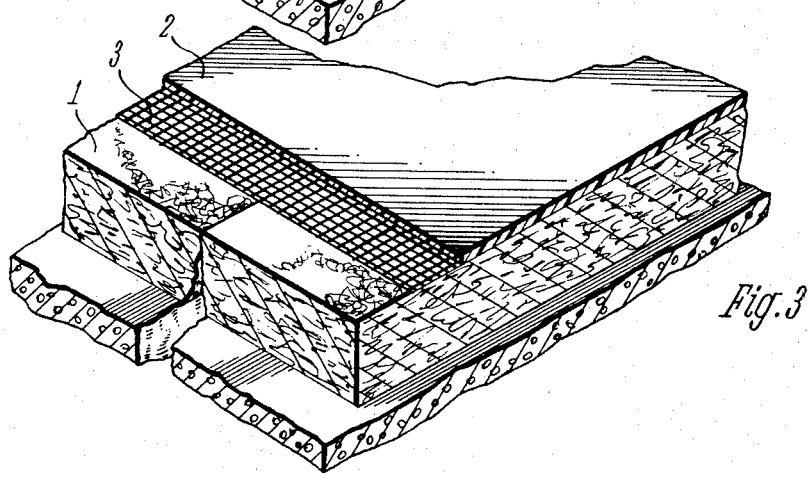

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which: FIGS. 1, 2, and 3 are schematic, fragmentary, perspective views partially in cross-section of various embodiments of wall coverings according to the present invention.

Referring now to the drawing, it will be seen that the wall covering which covers and adheres to an underlying or supporting wall 5, comprises a cellular resilient layer 1 and an outer continuous coating 4 of plaster, lacquer, or the like. Interposed between cellular resilient layer 1 and 1 and the outer continuous coating 4 is an intermediate layer 2 which is also a continuous layer, preferably consisting of a synthetic resin, and having embedded therein a reinforcing fabric, preferably a glass fiber fabric, or reinforcing fibrous material.

According to FIG. 1, the resilient cellular layer 1 is formed as a continuous layer, while according to FIG. 2 the layer 1 consists of individual plates forming small joints 6 therebetween. It will be seen that notwithstanding the joints 6 between individual plates of layer 1, layers 2 and 4 are continuous layers.

FIG. 3 illustrates what happens when a crack is formed in the underlying wall 54. Crack 7 will to some extent tear the adjacent portion of layer 1, however, it will not extend throughout the entire thickness of the layer so that the outer face of layer 1 which is contacted by layer 2 will remain a continuous face. Thus, it is prevented that any crack which might be formed in wall 5, or any joint between adjacent plates of layer 1 will extend outwardly to the outer coating or plaster layer 4.

FIG. 1 illustrates a basic principle of the invention, namely the sequence in which the layers are to be applied, whereby layer 1 which preferably has a thickness of between 1 and 10 centimeters is formed of a resilient, cellular, plastic material, such as foam rubber or polyurethane preferably, however, of polystyrene.

Layer 2 preferably will consist of a synthetic resin such as polyvinyl chloride or a butadiene-styrene copolymer having quartz powder distributed therethrough and including, for instance, a propionic acid ester as binder. According to a preferred embodiment, the thus formed mixture may be mixed with cement, for instance, an equal amount by weight of Portland cement. The layer formed of the mixture, which is then wetted, preferably has a thickness of about 1 millimeter or up to 2 millimeters. A glass fiber reinforcing fabric 3 is pressed into and embedded in layer 2. The thickness of the glass fiber fabric, dependent upon the strength requirements of the structure, will be between $\frac{1}{10}$ of 1 millimeter up to about 1 millimeter.

The cover layer or coating 4 is preferably formed of a propionic acid ester or other suitable binder materials well known in the art, having dispersed therethrough a conventional mineral aggregate in finely subdivided form, such as limestone, quartz or the like. The thickness of layer 4 preferably will be between about 1.5 and 2 millimeters.

Thus, the entire wall covering will have a thickness which is primary determined by the thickness of the resilient cellular layer 1, which preferably will be between 1 centimeter and 10 centimeters while the combined thickness of the superposed layers 2, 3 and 4 will amount only to a few millimeters.

Since the specific weight of the cellular layer 1 is very low and the solid layers superposed thereon are so very thin, the total weight per unit of covered wall area will be very small.

The wall covering may be produced in a very simple manner on a supporting wall or layer which may be a concrete wall, a brick wall, a wooden wall structure, or any other wall or roof structure. Onto this supporting layer 5, the resilient cellular layer 1 is applied, for instance, in the form of preformed plates or sheets. These plates or sheets may be adhesively adhered to wall 5 with any of the conventional adhesives known for this purpose, or the material of layer 2 may be used as an adhesive for adhering layer 1 to wall 5. However, it is also possible to adhere layer 1 to wall 5, for instance in the case where wall 5 is represented by a concrete wall, by introducing the plates of layer 1 into the casing or form in which then the concrete for the concrete wall is poured, so that the plates of layer 1 will adhere to the solidifying concrete. Layer 2 is then either sprayed or trowelled onto layer 1 and, while still wet, glass fabric 3 is pressed into layer 2. After the combined layer 2–3 has dried, which may take between one and two days, the outer coating 4 is applied by spraying or trowelling or with a paint roller.

FIG. 2 shows the same structure and illustrates that an interstice or joint between two adjacent plates 1 will not cause any crack or continuation of such interstice through layers 2–3 and into layer 4.

FIG. 3 illustrates how it is prevented that cracks which may form in supporting wall 5 will extend outwardly to the outer coating 4. The layer 4 is omitted from FIG. 3 because it is clearly shown that crack 7 in wall 5 will extend partly through resilient layer 1 but will be prevented from extending into intermediate layer 2 and particularly will be prevented by glass fiber fabric 3 from extending into the outer portion of layer 2. Since layer 2 thus remains a continuous layer, obviously the crack will also not continue into superposed layer 4.

The forces exerted by crack formation will be completely absorbed in layer 1, so that practically no force will be exerted against layer 2–3. The strength of layer 2–3 may equal about 16 kg./cm.$^2$. Thus, layers 2 and 3 and of course also layer 4, will always form a completely crack and joint free continuous covering which fully covers any cracks which may extend into or through the resilient layer 1. Actually, the cracks which extend from the supporting wall 5 into resilient layer 1 will hardly ever reach the vicinity of the outer face of layer 1 which contacts layer 2. Furthermore, layer 1 will also act as a thermo-insulating material and thus will protect the wall 5 from exposure to sudden heat variations to which the outer face of layer 4 may be exposed, for instance by varying atmospheric conditions.

Due to the small cross sectional dimensions of layers 2 and 4, the same will not exert any significant stress on layer 4. The degree of moisture penetrability of the various layers can be adjusted, in a manner known per se, depending upon the specific requirements in each case.

The present invention thus provides a jointless continuous covering for ceilings, walls, or the like at the outer or inner face thereof, i.e. interior or outer walls, which may be applied regardless of the type of construction and material of the wall which may be a load carrying wall or a separating wall which is not capable of carrying loads, and which wall may consist of concrete, brick, wood, metal, or synthetic material. It is thereby unimportant whether layer 1 consists of one plate or web, or of a plurality of webs or plates which are located adjacent to each other. It is also possible to form a continuous layer 1 by spraying foamable resilient material onto wall 5. Furthermore, the plates of layer 1 may be attached to each other by a folding joint, or may be edge-wise abutting, or may be adhesively connected by a tongue and groove arrangement, or any other manner. Layer 1 acts as a resilient layer for taking up any cracks which may be formed in the underlying wall 5 and, at the same time, will form an effective heat insulation to prevent wall 5 from being subjected to sudden temperature changes. The hard intermediate connecting layer 2 is reinforced with a reinforcing fabric, preferably of glass fibers or also of synthetic material, which may be embedded in layer 2, whereby adjacent webs of the reinforcing fabric may either abut each other or may have overlapping edges.

The reinforcing fabric may also be replaced by a random arrangement of reinforcing fibers. The thus formed reinforced layer 2 forms a carrier for the outer coating 4 which may consist of conventional lacquers, insulating paints, or plaster finishes or coatings in a thickness of about 1.5 mm., or in any event sufficiently thin so that no significant stress is exerted by the combined weight of layers 2, 3, and 4 onto the underlying resilient and relatively thick cellular plastic layer 1.

According to the present invention, it is possible to provide a joint-free, resilient wall covering or cover layer on structural elements so that the free surface of such covering will remain crack-free even if cracks should occur in the underlying structure. Furthermore, the wall covering, according to the present invention, is of very low weight per unit of volume.

This is accomplished according to the present invention, by interposing between the wall or structural element which is to be covered and which may consist of concrete, wood, metal or other suitable material, and the outer skin which is resistant against atmospheric influences and which is formed of layers 2, 3 and 4, a resilient, springy cellular, thermoinsulating layer 1. Layer 1 absorbs any movement of the underlying wall 5 without conveying such movement to layers 2, 3, and 4. Up to now, it was necessary to interpose retarding materials particularly heat insulating materials, within the wall structure, for instance, in the manner of the so-called sandwich structures.

Since the heat insulating and movement retarding properties of the materials of which layer 1 may be formed are connected with the enclosure of air within the closed cells thereof, it is desirable to form as many closed air cells as possible. Thus, for this purpose, natural products such as cork, or natural or synthetic materials which have been foamed may be used, as natural foamed mineral material, for instance, pumice of volcanic origin.

However, it is possible to foam many materials such as glass, various clays, polystyrene, and the like. Polystyrene is particularly suitable according to the present invention for forming layer 1, since it is possible to incorporate in a foam polystyrene body or plate, 98% of air. The specific weight of such foam body is reduced to such an extent that, for instance, a cubic meter of foamed polystyrene may weigh only between 13 and 15 kilograms. According to the invention, the foamed layer should be formed of materials which will endow the layer with a significant degree of resiliency.

If such retarding and protecting layers, particularly resilient and thermo-insulating layers, are applied to the outer face of a building element, such as a wall or the like, then such layers have to be protected by an outer protective layer or coating. For this purpose, it has been proposed to hang plates in front of the outer face of the foam layer. This, however, has certain disadvantages which are connected with the high specific weight of such plates, and the fact that the same per se, do not possess any heat insulating or movement absorbing properties. Such plates which are hung in front of the resilient cellular layer must be firmly anchored in the weight carrying structure of the wall. If for this purpose metal joints or connecting members are used then, unavoidably, stresses will be formed and temperature differentials will be conveyed by such metal connecting elements. Synthetic materials have not been used successfully for holding such outer plates to the load carrying structure of the wall. Due to the fact that these outer plates do not possess thermo-insulating properties, they suffer the effects of sudden temperature changes by expansion and contraction. If a plaster layer or the like is applied to the resilient layer, then it is unnecessary to connect such plaster layer with the load carrying building element, but due to the high weight of a conventional plaster layers and the like this method of covering the resilient cellular layer can be carried out only for relatively small surface areas. Nevertheless, crack formation can be expected.

The difference in the weight of the wall covering according to the present invention as compared with conventional wall coverings, is very significant. Thus, concrete plates having a minimum thickness of 5 centimeters will weigh about 120 kilograms per square meter, while lime-cement plaster in a thickness of 2 centimeters will weigh about 38 kilograms after drying and solidification.

On the other hand, the wall covering according to the present invention, including a layer 1 consisting of foamed polystyrene (for instance such as is known under the trademark "Styroper") in a thickness of 2.5 centimeters will weigh only about 3.9 kilograms per square meter.

It is thus possible according to the present invention to form a jointless, continuous covering for the entire outer or inner wall. The outer layer or skin of the covering which is resistant to atmospheric influences, is along its entire extension fully and homogeneously attached to the resilient thermo-insulating layer 1. The color of the outer skin can be controlled, for instance, by incorporating in layer 4 suitable pigments. Each of the layers adheres along its entire extension fully to the underlying layer. Due to the fact that the weight of the jointless outer skin 4, or of outer layers 4, 2 and 3, is very low, and that all layers firmly adhere to each other without any spaces therebetween, there will be no stress or shearing effect such as is experienced when applying conventional plaster layers to an underlying layer. The incorporation or embedding of reinforcing fibers or of a fabric of glass or synthetic fibers will give over the entire extension or area of the outer layers an even tensile strength within the outer skin which has a thickness of only between 1.5 and 2 millimeters.

When it is desired to provide the wall covering of the present invention primarily for thermo-insulating purposes, then the best effect is achieved by applying the wall covering to the outer face of the structure which is exposed to the outer atmosphere. However, in some cases it will also be desirable to apply the thermo-insulating wall covering of the present invention on a interior wall face.

By applying the thermo-insulating covering of the present invention to the outside wall of the structure, heat may be stored within the walls or roof and will not be dissipated to the outer atmosphere and, at the same time, it is prevented that the temperature changes and differentials to which the outer face of the structure is exposed will directly affect the load carrying or not load carrying structural element. For instance, certain fatigue phenomena are found in prestressed steel reinforcements due to the continuing expansion and contraction of the steel reinforcements when the same are subjected to temperature changes. This cause for fatigue phenomena is greatly reduced by applying to such steel reinforced structural element the wall covering of the present invention. Due to the excellent heat insulating effect of the wall covering described herein, frequently savings on heating or cooling costs will pay for the installation of the wall covering. Since the heat conductivity or the heat insulating materials used according to the present invention, such as a foamed polystyrene layer or plate is well known, it is possible to calculate exactly the thickness of such foamed resilient heat insulating plates or layers which is required in order to achieve a predetermined insulating effect.

The present invention may be carried out in connection with applying a wall covering irrespective of whether pre-formed structural elements are combined, or whether the entire wall or the like is formed at its final location. When pre-formed elements are used, the same must be assembled in abutting position and thereby joints are formed between the individual elements, which joints conventionally have to be filled or otherwise treated. This is expensive and generally not very satisfactory. The known jointing materials are subject to aging processes which differ from those of the material of the preformed building elements. By applying to a wall or the like formed of pre-formed elements the continuous wall covering of the present invention, the entire problem of filling or otherwise treating the joints between adjacent preformed building element is eliminated.

The uniform tensile strength of the outer skin of the wall covering of the present invention is achieved by embedding the reinforcing fabric 3 into intermediate layer 2. It is also possible to replace the reinforcing glass fabric or the like with glass fibers or fibers of synthetic material which are admixed to the material forming layer 2. The fabric or fibers containing mass of layer 2 will be adhered as closely as possible to the thermo-insulating resilient cellular layer 1.

Layers 2 and 4 which are applied in wet condition preferably will be air dryed and both layers may be applied at ambient temperature by a so-called cold method. In cases where particularly high requirements are made with respect to the tensile strength of the outer layers, these can be easily met by a suitable choice of the fibrous or fabric reinforcement. All of the materials which are required for forming the wall covering of the present invention can be easily produced by conventional methods in any desired color.

The permanent elimination of crack formation at the outer face of the wal covering of the present invention, is assured by the interposition of the relatively soft resilient layer 1 between the outer skin consisting of layers 2, 3 and 4, and the supporting wall 5. This yielding layer 1 formed for instance of foamed polystyrene, has only a very low tensile strength and will "give" or move easily corresponding to any movement of, or in, the underlying wall 5, while the outer skin consisting of layers 2, 3, and 4 will have a high tensile strength and tear-resistance, due to the incorporation of reinforcing fibers in layer 2. The tensile strength and tear resistance of layer 3 can be easily adjusted to any desired degree by suitable choice of the above mentioned reinforcing materials.

It will be understood that each of the elements described above, or two or more together, may also find a useful application in other types of wall coverings differing from the types described above.

While the invention has been illustrated and described as embodied in thermo-insulating coverings for walls, roofs, and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is new and desired to be secured by Letters Patent is:

1. A wall covering comprising, in combination, a resilient thermo-insulating cellular polystyrene layer adapted to be adhered to a supporting wall member and to take up any cracks forming in said wall member; a continuous solid outer coating formed of finely subdivided mineral aggregate dispersed in a binder material; and a continuous intermediate layer consisting essentially of a polyvinyl chloride having quartz powder distributed therethrough and of a propionic acid ester binder and having a reinforcing fabric embedded therein interposed between and firmly adhering to said cellular layer and said continuous solid outer coating, whereby said continuous outer coating will remain unaffected by any movement or cracks formed in the supporting wall member due to the resilient absorption of such movement and the taking up of such cracks by said resilient cellular layer.

2. A wall covering comprising, in combination, a resilient thermo-insulating cellular layer adapted to be adhered to a substantially vertical supporting wall member and to take up any cracks forming in said wall member; a continuous solid outer plaster coating consisting essentially of a mixture of quartz and synthetic resin cementitious material; and a continuous intermediate layer consisting essentially of a synthetic resin having a reinforcing fabric embedded therein interposed between and firmly adhering to said cellular layer and said continuous solid outer coating, whereby said continuous outer coating will remain unaffected by any movement or cracks formed in the supporting wall member due to the resilient absorption of such movement and the taking up of such cracks by said resilient cellular layer.

3. A method of producing a wall covering, roofing and the like, comprising the steps of adhering to a support adjacent to and contacting each other a plurality of resilient thermo-insulating cellular polystyrene plates; forming on the free face of said plurality of resilient cellular plates a continuous intermediate layer adhering to said cellular resilient plates and consisting essentially of a synthetic resin having a reinforcing glass fabric embedded therein; and forming on the free outer face of said intermediate layer a continuous solid plaster coating.

4. A method of producing a wall covering, roofing and the like, comprising the steps of adhering to a support adjacent to and contacting each other a plurality of resilient thermo-insulating cellular polystyrene plates having a thickness of between about 1 and 10 cm.; forming on the free face of said plurality of resilient cellular plates a continuous intermediate layer adhering to said cellular resilient plates and consisting essentially of a synthetic resin having a reinforcing glass fabric embedded therein and having a thickness of about 1.0 mm.; and forming on the free outer face of said intermediate layer a continuous solid plaster coating having a thickness of up to about 2 mm.

References Cited

UNITED STATES PATENTS

| | | | |
|---|---|---|---|
| 2,246,101 | 6/1941 | McEnany | 161—161 |
| 2,731,682 | 1/1956 | Evans | 52—622 |
| 2,888,360 | 5/1959 | Sherts | 52—309 X |
| 2,908,602 | 10/1959 | Collardeau. | |
| 2,956,034 | 10/1960 | Simpson | 260—18 |
| 2,981,308 | 4/1961 | Thompson. | |
| 3,094,447 | 6/1963 | Chamberlain | 52—399 X |
| 3,122,073 | 2/1964 | Masse | 52—515 |
| 3,197,352 | 7/1965 | Coates | 161—161 X |
| 3,280,528 | 11/1966 | Dunlap | 52—309 |

FOREIGN PATENTS

| | | |
|---|---|---|
| 1,306,771 | 1962 | France. |
| 920,803 | 1963 | Great Britain. |
| 925,198 | 1963 | Great Britain. |

OTHER REFERENCES

Built-Up Roofs, AIA File No. 12–B–1, Specification RBR 341, Insulated Decks; September 1948, pp. 1 and 2; published by Fiberglas Corp.; copy in group 160.

JOHN E. MURTAGH, *Primary Examiner.*